(12) United States Patent
Bovero et al.

(10) Patent No.: US 10,746,534 B2
(45) Date of Patent: Aug. 18, 2020

(54) SMART COATING DEVICE FOR STORAGE TANK MONITORING AND CALIBRATION

(71) Applicant: Saudi Arabian Oil Company, Dhahran (SA)

(72) Inventors: Enrico Bovero, Dhahran (SA); Ali Outa, Thuwal (SA); Ihsan M. Al-Taie, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 330 days.

(21) Appl. No.: 15/640,853

(22) Filed: Jul. 3, 2017

(65) Prior Publication Data

US 2019/0003826 A1    Jan. 3, 2019

(51) Int. Cl.
*G01J 1/42* (2006.01)
*G01B 11/16* (2006.01)

(52) U.S. Cl.
CPC ............ *G01B 11/165* (2013.01); *G01B 11/18* (2013.01)

(58) Field of Classification Search
CPC .............................. G01B 11/165; G01B 11/18
USPC .................................................... 250/227.15
See application file for complete search history.

(56) References Cited

U.S. PATENT DOCUMENTS

| | | | |
|---|---|---|---|
| 2,922,212 A * | 1/1960 | Textrom | F16B 2/08 24/20 CW |
| 4,781,455 A | 11/1988 | Machler et al. | |
| 4,939,368 A | 7/1990 | Brown | |
| 5,446,286 A | 8/1995 | Bhargava | |
| 5,568,259 A | 10/1996 | Kamegawa | |
| 5,682,236 A | 10/1997 | Trolinger et al. | |
| 5,682,237 A | 10/1997 | Belk | |
| 5,734,108 A | 3/1998 | Walker et al. | |
| 5,770,155 A | 6/1998 | Dunphy et al. | |
| 5,881,200 A | 3/1999 | Burt | |
| 6,091,872 A | 7/2000 | Katoot | |
| 6,200,503 B1 | 3/2001 | Katoot et al. | |
| 6,460,417 B1 | 10/2002 | Potyrailo et al. | |
| 6,499,355 B1 | 12/2002 | Potyrailo | |
| 6,833,274 B2 | 12/2004 | Lawrence et al. | |
| 6,854,327 B2 | 2/2005 | Rambow et al. | |
| 7,095,502 B2 | 8/2006 | Lakowicz et al. | |
| 7,138,621 B2 | 11/2006 | Wang | |
| 7,308,163 B2 | 12/2007 | Bratkovski et al. | |
| 7,362,938 B1 | 4/2008 | Herz et al. | |
| 7,489,402 B2 | 2/2009 | Selker et al. | |

(Continued)

FOREIGN PATENT DOCUMENTS

| CA | 2712880 | 2/2012 |
|---|---|---|
| CN | 1743795 | 3/2006 |

(Continued)

*Primary Examiner* — Georgia Y Epps
(74) *Attorney, Agent, or Firm* — Leason Ellis LLP (57) ABSTRACT

A device and system for enabling calibration of a structure includes at least one elongate strap having a lower temperature coefficient than the structure, and a length sufficient to encompass a circumference of an external surface of the structure, and at least one diffraction grating having a temperature coefficient at least as high as the structure, wherein the diffraction grating is coupled to the strap and is in direct contact with the external surface of the structure. Deformations in the external surface of the structure induce corresponding deformations in the diffraction grating.

15 Claims, 7 Drawing Sheets

(56) References Cited

U.S. PATENT DOCUMENTS

| | | |
|---|---|---|
| 7,576,347 B2 | 8/2009 | Harding |
| 7,646,945 B2 | 1/2010 | Jones et al. |
| 7,780,912 B2 | 8/2010 | Farmer et al. |
| 7,787,734 B2 | 8/2010 | Hyde |
| 7,849,752 B2 | 12/2010 | Gregory et al. |
| 7,957,617 B2 | 6/2011 | Vollmer et al. |
| 7,961,315 B2 | 6/2011 | Cunningham et al. |
| 8,135,244 B1 | 3/2012 | Sander et al. |
| 8,153,066 B2 | 4/2012 | Weisbuch |
| 8,344,333 B2 | 1/2013 | Lu et al. |
| 8,409,524 B2 | 4/2013 | Farmer et al. |
| 8,576,385 B2 | 11/2013 | Roberts |
| 8,685,488 B2 | 4/2014 | Hoffmuller et al. |
| 8,725,234 B2 | 5/2014 | Cao et al. |
| 8,852,512 B2 | 10/2014 | Lam et al. |
| 8,854,624 B2 | 10/2014 | Pervez et al. |
| 8,953,159 B2 | 2/2015 | Cunningham et al. |
| 9,086,331 B2 | 7/2015 | Carralero et al. |
| 9,170,172 B2 | 10/2015 | Hunt et al. |
| 2001/0055445 A1* | 12/2001 | Gaylord .............. G01N 21/4788 385/37 |
| 2002/0186921 A1 | 12/2002 | Schumacher et al. |
| 2004/0150827 A1 | 8/2004 | Potyrailo et al. |
| 2007/0183464 A1* | 8/2007 | Poulsen .............. G02B 6/02171 372/6 |
| 2008/0144001 A1 | 6/2008 | Heeg et al. |
| 2008/0303419 A1* | 12/2008 | Fukuda .............. H01L 27/3246 313/504 |
| 2009/0202194 A1* | 8/2009 | Bosselmann ...... G01K 11/3206 385/12 |
| 2010/0254650 A1* | 10/2010 | Rambow ............ G01D 5/35383 385/13 |
| 2012/0143523 A1 | 6/2012 | Chen et al. |
| 2012/0287441 A1* | 11/2012 | Kuroda .................. G01B 11/02 356/499 |
| 2013/0279004 A1 | 10/2013 | Foland et al. |
| 2013/0321907 A1 | 12/2013 | Kennedy et al. |
| 2014/0323323 A1 | 10/2014 | Cunningham et al. |
| 2015/0247744 A1* | 9/2015 | Tu ....................... G01D 5/35316 250/227.14 |
| 2015/0268237 A1 | 9/2015 | Kerimo et al. |
| 2016/0069757 A1 | 3/2016 | Ghatak et al. |

FOREIGN PATENT DOCUMENTS

| | | | |
|---|---|---|---|
| CN | 1831486 | 9/2006 | |
| CN | 1844856 | 10/2006 | |
| CN | 102230834 | 11/2011 | |
| CN | 103808441 | 5/2014 | |
| CN | 103811998 | 5/2014 | |
| CN | 103812002 | 5/2014 | |
| CN | 203857939 | 10/2014 | |
| CN | 204115925 | 1/2015 | |
| DE | 102014203254 | 8/2015 | |
| EP | 1296117 | 3/2003 | |
| GB | 2421075 | 6/2006 | |
| GB | 2457277 A * | 8/2009 | ............ G01B 11/18 |
| JP | 2007139698 | 6/2007 | |
| WO | WO2007034379 | 3/2007 | |
| WO | WO2012098241 | 7/2012 | |
| WO | WO2014063843 | 5/2014 | |
| WO | WO2014111230 | 7/2014 | |

* cited by examiner

SMART COATING DEVICE FOR STORAGE TANK MONITORING AND CALIBRATION

FIELD OF THE INVENTION

The present invention relates to monitoring structures for structural changes including deformation, and in particular relates to a device that can be positioned on the surface of a structure that can be used for monitoring such structural changes.

BACKGROUND OF THE INVENTION

Pipeline and vessel structures used in the oil and gas industry are exposed to stresses over time that can accumulate to produce defects in the structure. Unfortunately, it is typically difficult to determine whether such structures are being subjected to damaging stresses until easily observable defects occur.

The availability of non-destructive inspection techniques for structural materials, for instance, nonmetallic pipes used in pipelines, is limited. For the most part, the techniques available so far are either destructive to the material or are experimental and unreliable. Even considering current experimental techniques for non-destructive inspection, no current techniques are able to reliably predict the formation of defects, and therefore are generally used to detect only existing defects.

More specifically, existing building materials and the corresponding systems and techniques for inspection of the materials are inadequate for detecting the presence of stresses on or in the material such as tensile stress or compressive stress with sufficient accuracy and precision such that defects can be predicted before they occur. Currently available technologies for sensing material defects are generally based on mono-dimensional fiber Bragg gratings. These fibers provide mono-dimensional information: i.e., they can detect only stress that occurs along the length of the fiber, and only substantial stresses that correspond to already damaged materials with significant cracks and ruptures in the structural material.

There is a need for a method for accurately detecting perturbations in large structures over more than one dimension. There is also a need for such a method that can be performed quickly and non-destructively.

It is with respect to these and other considerations that the disclosure made herein is presented.

SUMMARY OF THE INVENTION

According to the present invention, embodiments of a device for enabling calibration of a structure are provided. Embodiments of the device comprise at least one elongate strap having a lower temperature coefficient than the structure, and a length sufficient to encompass a circumference of an external surface of the structure, and at least one diffraction grating having a temperature coefficient at least as high as the structure, wherein the diffraction grating is coupled to the strap and in direct contact with the external surface of the structure. Deformations in the external surface of the structure induce corresponding deformations in the diffraction grating.

In some embodiments, the at least one elongate strap includes a first strap positioned at a first height on the external surface of the structure and a second strap positioned at a second height on the external surface of the structure. In some implementations, one or more of the at least one elongate strap includes a plurality of segments, each of the plurality of segments including a diffraction grating. The at least one diffraction grating can be two-dimensional and can include periodic features aligned in perpendicular directions. The at least one elongate strap can also be composed of a glass fiber material.

In other embodiments, a system for enabling calibration of a structure is also provided. The system comprises an indicator device in contact with an external surface of the structure. The indicator device includes at least one elongate strap having a lower temperature coefficient than the structure, and a length sufficient to encompass a circumference of an external surface of the structure, and at least one diffraction grating having a temperature coefficient at least as high as the structure, wherein the diffraction grating is coupled to the strap and in direct contact with the external surface of the structure, wherein deformations in the external surface of the structure induce corresponding deformations in the diffraction grating. The system also comprises an inspection device for determining dimensional changes to the structure by interrogating the at least one diffraction grating of the indicator device.

Embodiments of the inspection device include a radiation source for irradiating a section of the structure, a radiation sensor for receiving radiation diffracted from a photonic material in the section of the structure, and a processor coupled to the sensor configured to determine a deformation of the at least one diffraction gratin as a function of at least one of i) an intensity ii) a position and iii) a wavelength of the radiation received. In some embodiments, the radiation source emits monochromatic radiation and deformation of the at least one diffraction grating is determined as a function of an intensity of the radiation received at the radiation sensor. In other embodiments, the radiation source emits polychromatic radiation and the deformation of the at least one diffraction grating is determined as a function of the wavelength of the radiation received. In still other embodiments, two or more radiation sources, including both monochromatic and polychromatic radiation sources, can be used. In some implementations in which polychromatic radiation sources are used, the polychromic radiation is in the visible spectrum and the radiation sensor comprises a camera having a plurality of pixel elements having distinct positions.

In some embodiments, the at least one elongate strap of the indicator device includes a first strap positioned at a first height on the external surface of the structure and a second strap positioned at a second height on the external surface of the structure. In some implementations, one or more of the at least one elongate strap of the indicator device includes a plurality of segments, each of the plurality of segments including a diffraction grating. The at least one diffraction grating of the indicator device is two-dimensional and includes periodic features aligned in perpendicular directions. In addition, the at least one elongate strap of the indicator device can be composed of a glass fiber material.

These and other aspects, features, and advantages can be appreciated from the following description of certain embodiments of the invention and the accompanying drawing figures and claims.

DETAILED DESCRIPTION OF CERTAIN EMBODIMENTS OF THE INVENTION

In one or more embodiments, a device for enabling the calibration of a structure is disclosed. For the purposes of this application "calibrating" a structure means determining the precise size of the structure, including the precise magnitude of any and all dimensions of the structure (i.e., width, length, height) and any changes in such dimensions, including the locations of such changes.

An embodiment of the device includes an elongate strap coupled to at least one diffraction grating. The strap is designed to be long enough to encompass the circumference of the structure; more specifically, if the structure has a variable circumference, the strap is designed to encompass a circumference of the external surface of the structure. In some embodiments, the strap is wrapped tightly around the structure and affixed at particular height. In other embodiments, a plurality of straps can be used, and the plurality of straps can be affixed at different heights on the structure. In addition, an individual strap can be comprised of a plurality of segments that are connected to each other. The material of the strap is selected to have a relatively low temperature coefficient (preferably lower than the temperature coefficient of the monitored structure), while the diffraction grating is generally patterned onto a photonic material selected to have a high temperature coefficient (preferably higher than the temperature coefficient of the monitored structure).

When a strap device is affixed to a structure, as the structure expands or contracts due to temperature variations or due to other causes, the strap, and the diffractive grating coupled to the strap, are subject to the same variations, and expand or contract correspondingly to an equal, lesser or greater extent dictated by their temperature expansion coefficients. The material of the diffraction grating is selected to have a high coefficient so that it fully registers the deformations of the underlying structure. The diffraction grating can then provide the functionality of a "smart material" since the deformation of the diffraction grating can be determined to with very precise limits using diffraction techniques. Since the grating has a temperature expansion coefficient at least as high as the underlying structure, the extent of any deformation of the grating places an upper bound on the extent of deformation of the underlying structure. In addition, the differential effects of temperature on the grating and underlying structure can be compensated for to precisely determine the extent of deformation in the structure. Similarly, when the surface of the structure is subject to deformation due to other causes, for example, internal pressure, the deformation is transmitted to the strap and grating which is in direct contact with the structure surface.

An inspection apparatus can be used to "interrogate" the one or more diffraction gratings positioned at various locations on a monitored structure via one or more affixed straps. The inspection apparatus includes a radiation source for emitting radiation onto the one or more diffraction gratings, and a radiation sensor such as a camera adapted to receive radiation diffracted by the one or more diffraction gratings. Depending on the inspection mode applied, the magnitude of any deformation or displacement in the one or more gratings can be determined. A corresponding magnitude of the deformation of the structure is directly determined from the deformation of the one or more gratings.

Figure 1A:
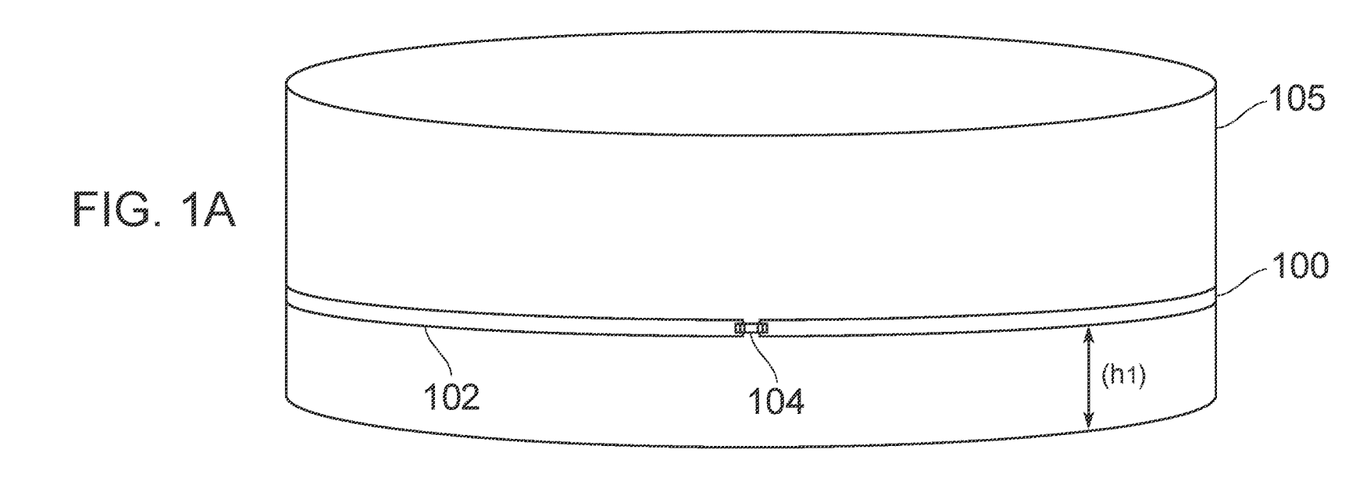
FIG. 1A is a schematic front plan view of an embodiment of a device for enabling calibration of a structure according to the present invention shown affixed to an exemplary structure.

FIG. 1A shows an embodiment of a device 100 for calibrating a structure that is shown disposed on the external surface of a structure 105 at a particular height (h1). The device 100 includes a strap 102 and a diffraction grating 104 that is coupled to the strap 102. The grating 104 can be adhesively bonded to the strap, or mechanically bonded via pins, clips, stitching or any other technique that securely couples the grating to the strap 102. As will be described in greater detail below, the diffraction grating can be interrogated to determine whether it has been subject to displacement or deformation using an inspection apparatus (not shown in FIG. 1A). The strap 102 of device 100 can be affixed to the structure 105 in a number of different ways. For example, the strap 102 can be affixed to structure 105 using adhesive, an additional coupling element that in turn couples to the structure such as a ledge, bracket or fastening member, or by any convenient, non-destructive and low-cost technique known to those of ordinary skill in the art. The strap 102 can be made from materials that have a temperature expansion coefficient that is lower than the material of the monitored structures, the latter usually being made from various types of steel. In some implementations, glass fibers, which have a temperature expansion coefficient in the range of $4.0\text{-}8.0 \times 10^{-6}$ m/m K can be used, although other materials having similar suitable properties can also be used. The diffraction grating 104 can be made from any photonic material with a large temperature expansion coefficient (e.g., $>50 \times 10^{-6}$ m/m K) in which optical gratings can be embedded such as, but not limited to, polyethylene (PE), polypropylene (PP), or polydimethylsiloxane (PDMS).

Figure 1B:
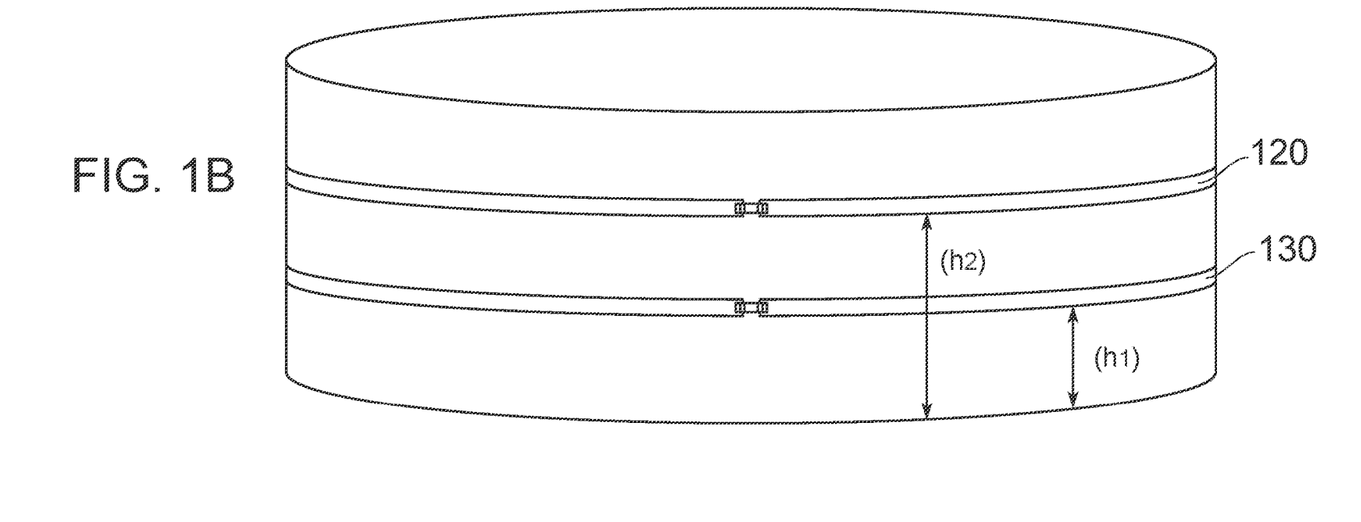
FIG. 1B is a schematic front plan view of another embodiment of a device for enabling calibration of a structure according to the present invention.

FIG. 1B illustrates another embodiment in which two devices 120, 130, including similar strap and diffraction grating elements, are disposed at different heights on structure 105. By affixing a first device 120 at a first height (h1) and a second device 130 at a second height (h2), the devices can capture possible differences in structural changes at varying heights on a structure. For example, due to differences in expose to sunlight, it is possible that there can be differences in temperature-induced expansion at different heights of the structure. The embodiment of FIG. 1B can aid in monitoring such differences.

Figure 2:
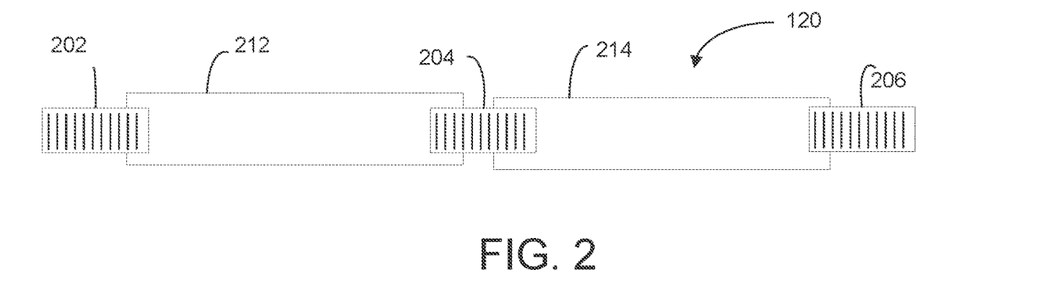
FIG. 2 is a schematic front plan view of another embodiment of a device for enabling calibration of a structure according to the present invention.

FIG. 2 shows another embodiment of a device 200 enabling calibration of a structure which comprises a plurality of diffraction gratings e.g., 202, 204, 206 and a plurality of strap segments 212 and 214. As depicted, grating 202 is coupled to a first end of strap segment 212. Grating 204 is coupled to a second end of strap segment 212 and also to first end of strap segment 214. Grating 206 is coupled to a second end of strap 214. Although device 200 includes three diffraction gratings of similar size coupled by two straps of similar size, the device can include a larger number of gratings and strap segments, and the strap segments and gratings can be of different sizes. Embodiments such as depicted in FIG. 2 enable gratings to be positioned at different circumferential positions on the external surface of the structure to capture variations in deformation that can occur at the different positions.

Figure 3A:
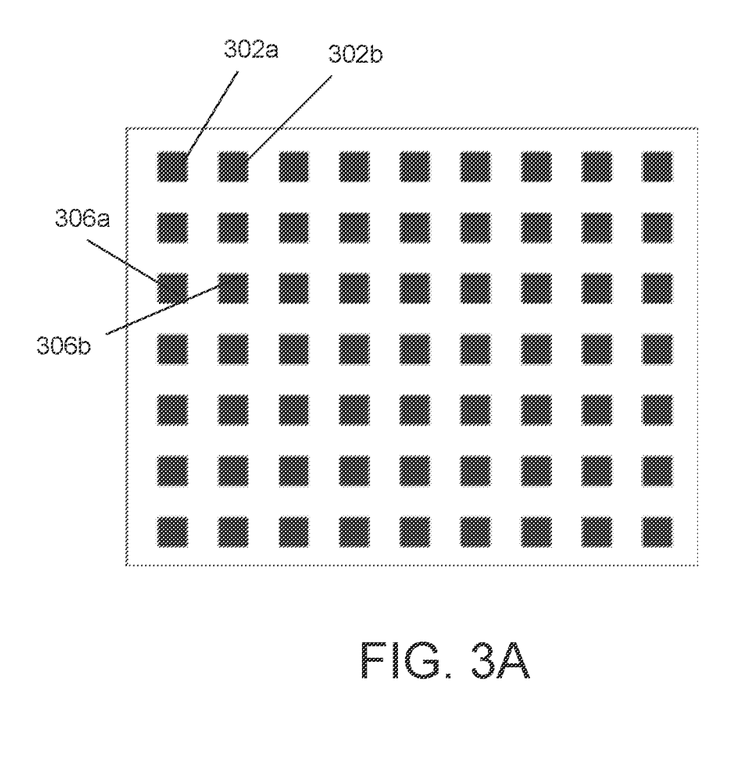
FIG. 3A is a schematic front view of an exemplary pattern for a two-dimensional diffraction grating used in embodiments of a device for enabling calibration of a structure according to the present invention.
Figure 3B:
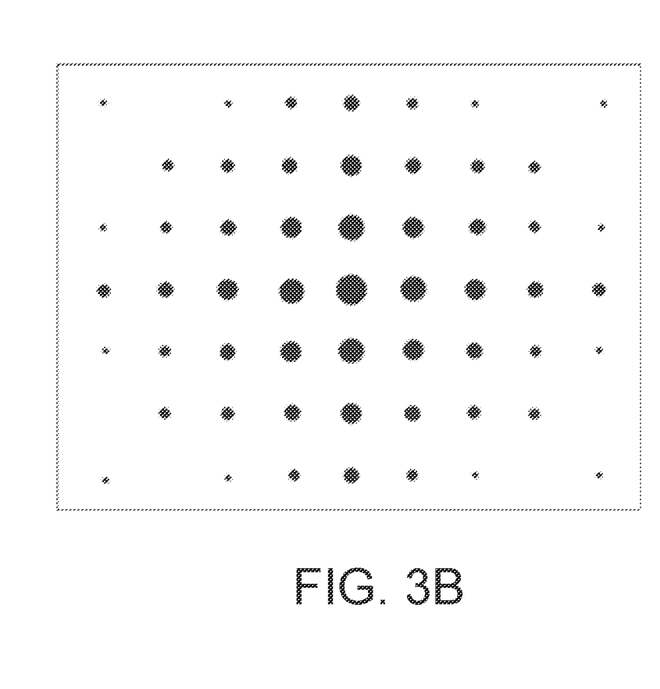
FIG. 3B is a schematic illustration of a diffraction pattern that can be produced by a two-dimensional grating pattern shown in FIG. 3A.

In the embodiment of FIG. 2, the diffractions gratings are shown schematically as a series of engraved lines, which illustrate one-dimensional diffraction gratings. However, two and three dimensional grating can also be used. FIG. 3A illustrates an exemplary pattern for a two-dimensional diffraction grating 300 that can be used in the devices of the present invention. The diffraction grating includes rows and columns of periodic features. For example, a first row includes a series of periodic features e.g., 302a, 302b and a third row includes another series of periodic features, e.g., 306a, 306b. FIG. 3B illustrates an exemplary two-dimensional diffraction pattern that can be generated using diffraction grating 300. A change in the displacement along the vertical direction will change the distance of the diffraction points along the vertical direction, while a displacement in the horizontal direction will change the distance of the diffraction spots along the horizontal directions. Thus, use of a two-dimensional grating can capture a greater range of surface deformation along the surface of a structure.

The inspection apparatus can operate in different inspection modes, such as, for instance, an angular mode and a wavelength mode. The inspection methods and modes are discussed in commonly assigned and co-pending U.S. patent application Ser. No. 15/594,116, entitled "Apparatus and Method for Smart Material Analysis". As discussed in the '116 application, in the angular mode, diffracted radiation is received at a radiation sensor and the deformation is determined as a function of the position at which a diffracted light beam strikes the sensor, or more specifically, the variance of x-intensity at positions on the sensor. The variance of intensity by location is used to determine a displacement distance. In the wavelength mode, the wavelength, as opposed to the intensity, of light received at one or more specific positions on the light sensor is used to quantify displacement. The sensitivity of the inspection is tunable through the choice of inspecting wavelength and corresponding periodicity of the photonic materials. In one or more embodiments, multiple inspection modes can be combined to assist in the determination of deformation of a structure 102 having an embedded photonic material 103, as will be appreciated from the discussion below.

Figure 4:
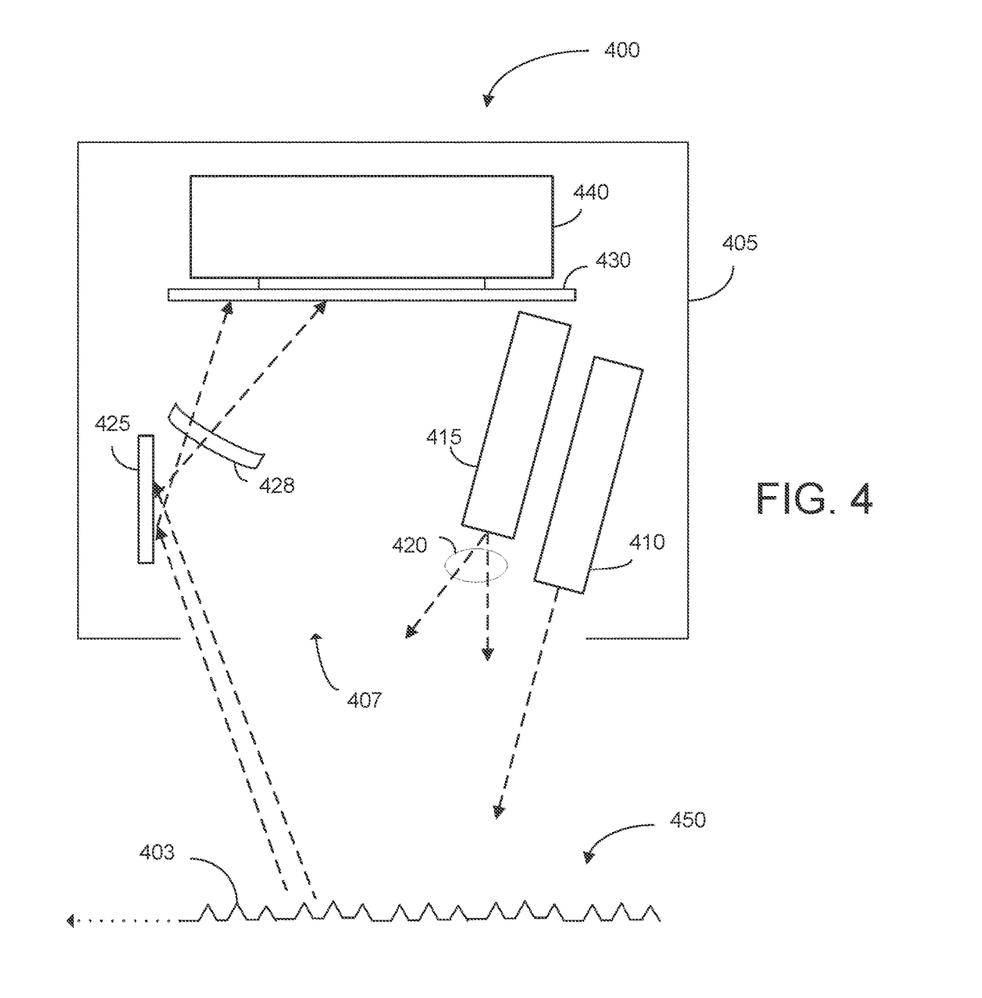
FIG. 4 is a schematic block diagram of components of an inspection apparatus according to an embodiment of the present invention.

FIG. 4 shows an exemplary embodiment of an inspection apparatus 400 according to the present invention used for inspecting a structure 402 having an embedded photonic material 403. The photonic material 403 can comprise a diffraction grating (preferably) but can also comprise other structures that exhibit a periodic variation in an optical characteristic, such as refraction index. Apparatus 400 comprises a housing 405 containing a number of components used for inspecting the structure that can be positioned and moved as a unit along a length of structure 402. For this purpose the housing 405 can be coupled to a vehicle, such as a robot or drone, or alternatively, the housing can include a driving mechanism and wheels for automatic locomotion. Housing 405 includes an opening 407 for radiation sources and detectors.

Positioned within housing 405 are radiation sources 410, 415 positioned to direct radiation toward a section of the structure 402. Although two radiation sources are depicted, in some embodiments a single source can be used, and in alternative embodiments, more than two sources can be used. In an exemplary implementation, radiation source 410 is a laser source (e.g., a collimated beam having, for instance, a single wavelength) and radiation source 415 is a diffused radiation source that emits a plurality of different wavelengths. The diffused radiation source 415 can take a wide range of forms and can emit radiation over a broad or narrow range of wavelengths, in the visible and/or outside the visible spectrum. For example, the diffused radiation source can be implemented using a white LED, a flash light, an X-ray emitter, or natural ambient radiation. One or more lenses e.g., 420 can be configured to focus the radiation emitted by the diffused radiation source 410 onto the structure 402 for inspection.

Radiation received at photonic material 403 is diffracted and reflected back toward the opening 407 of the inspection apparatus. In some embodiments, apparatus 100 includes a reflector 425 (as depicted) positioned so as to receive radiation diffracted from photonic material 403. Reflector 425 and one or more focusing components 428 are oriented to direct and focus the incoming radiation into a radiation sensor 430. Radiation sensor 430 can be implemented in numerous ways including as a digital camera, infrared detector, charge-coupled device (CCD) photomultiplier, photographic film, etc. In implementations in which the sensor constitutes a single element, the magnitude or intensity of the signal output by the sensor is used to determine displacement. For sensors that include an array of elements, such as a CCD array, the response of a particular array element (i.e., position) provides information from which displacement can be determined. In the embodiment depicted, radiation sensor is coupled to and transmits captured sensor data to a local processor 440. In alternative embodiments, the processor is located remotely and apparatus includes a wireless communication module (shown in FIG. 2) for transmitting the sensor data to the remotely-based processor.

Figure 5:
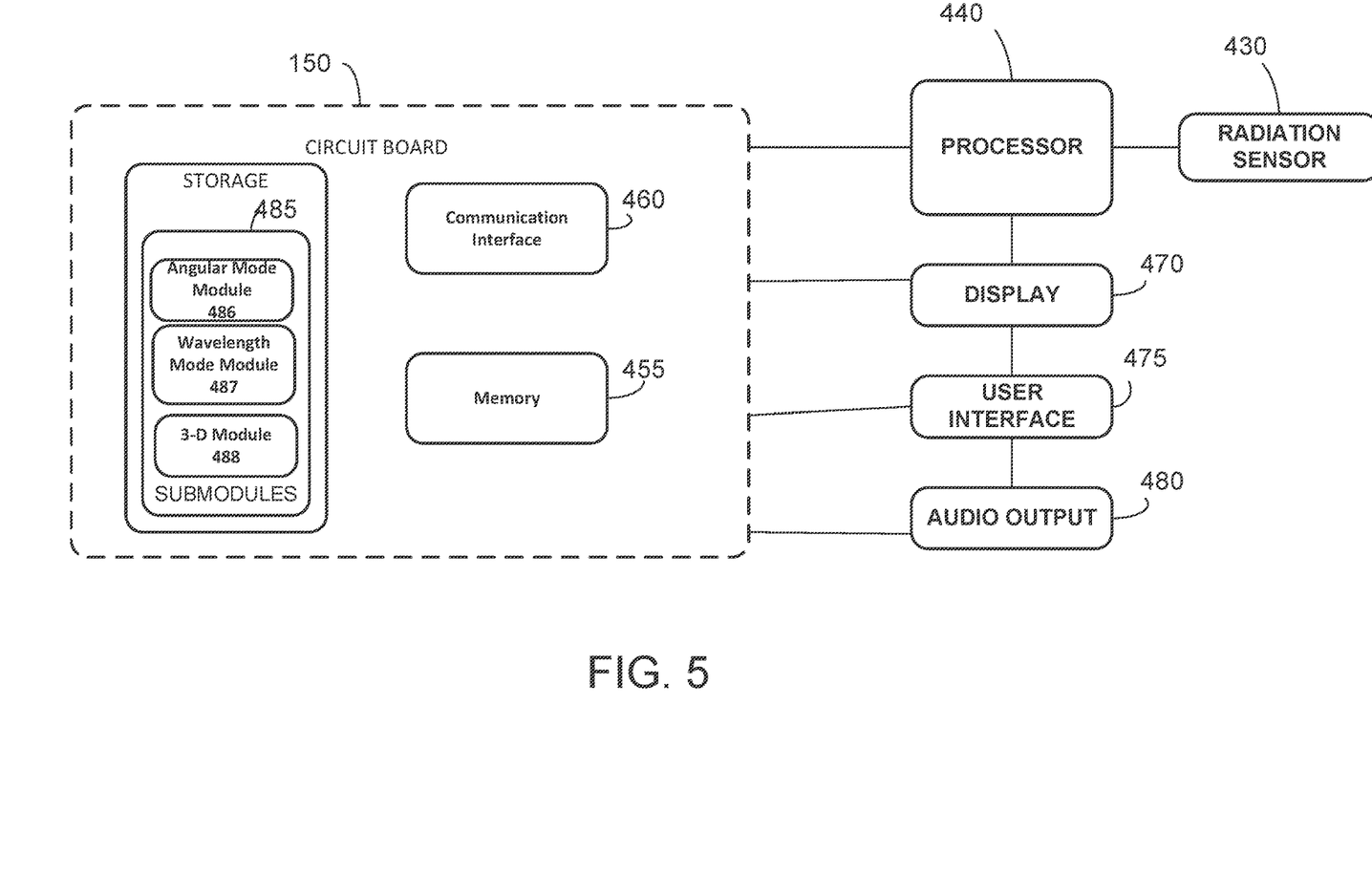
FIG. 5 is a perspective view illustrating the angular mode of inspection according to an embodiment of the present invention.

The inspection apparatus 400 can be arranged with various computer hardware and software components that serve to enable operation of the inspection device and, more specifically, perform operations relating to the analysis of the information captured by the radiation sensor 430. FIG. 5 is a block diagram depicting exemplary computer hardware and software components of the inspection device 400 including a processor 440 and a circuit board 150. As shown in FIG. 2, the circuit board can include a memory 455, a communication interface 460 and a computer readable storage medium 465 that are accessible by the processor 140. The processor 440 and/or circuit board 450 can also be coupled to a display 470, for visually outputting information to an operator (user), a user interface 475 for receiving operator inputs, and an audio output 480 for providing audio feedback as would be understood by those in the art. As an example, the apparatus 400 could emit a visual signal from the display 470 or a sound from audio output 480 when a defect or deformation above a certain threshold is encountered. The threshold can be set manually or by default prior to the measurement through the user interface 475 which could be a touch screen or suitable keyboard. Although the various components are depicted either independent from, or part of the circuit board 450, it can be appreciated that the components can be arranged in various configurations without departing from the disclosure herein.

The processor 440 serves to execute software instructions that can be loaded into the memory. The processor 440 can be implemented using multiple processors, a multi-processor core, or some other type of processor, as well as by distributed processors that collectively are referred to as a "processor" for purposes of this disclosure. The memory 455 is accessible by the processor 440, thereby enabling the processor to receive and execute instructions stored on the memory and/or on the storage. Memory 455 can be implemented using, for example, a random access memory (RAM) or any other suitable volatile or non-volatile computer readable storage medium. In addition, memory 455 can be fixed or removable. The storage medium 465 can also take various forms, depending on the particular implementation. For example, storage medium 465 can contain one or more components or devices such as a hard drive, a flash memory, a rewritable optical disk, a rewritable magnetic tape, or some combination of the above. The storage medium 465 also can be fixed or removable or remote such as cloud based data storage systems. The circuit board 450 can also include or be coupled to a power source (not shown) source for powering the inspection device.

One or more software modules 485 are encoded in the memory 455 and/or storage medium 465. The software modules can comprise one or more software programs or applications having computer program code or a set of instructions executed in the processor 440. Such computer program code or instructions for carrying out operations and implementing aspects of the systems and methods disclosed herein can be written in any combination of one or more programming languages. While software modules 485 are stored locally on processor 440, the processor can interact with remotely-based computing platform, preferably wirelessly, via a local or wide area network to perform calculations or analysis via communication interface 460.

During execution of the software modules 485, the processor 440 is configured to perform various operations relating to the analysis of the radiation captured by the sensor 430 for detecting and quantify perturbations in the inspected materials as a function of the diffraction pattern, as will be described in greater detail below. The program code of the software modules 485 and one or more of the non-transitory computer readable storage devices (such as the memory 455 and/or the storage 465) form a computer program product that can be manufactured and/or distributed in accordance with the present disclosure, as is known to those of ordinary skill in the art. In addition, information and/or data relevant to the configuration and operation of the present apparatuses and methods can also be stored in association with the software modules. Such information can include prescribed settings and parameters relating to the apparatus and the various materials and photonic materials that can be inspected such as expected diffraction patterns. Similarly, operational parameters that are specific to the inspection apparatus and various modes of operation (e.g., relevant dimensions of apparatus components, thresholds for deformation, radiation intensity) can also be stored.

Figure 6:
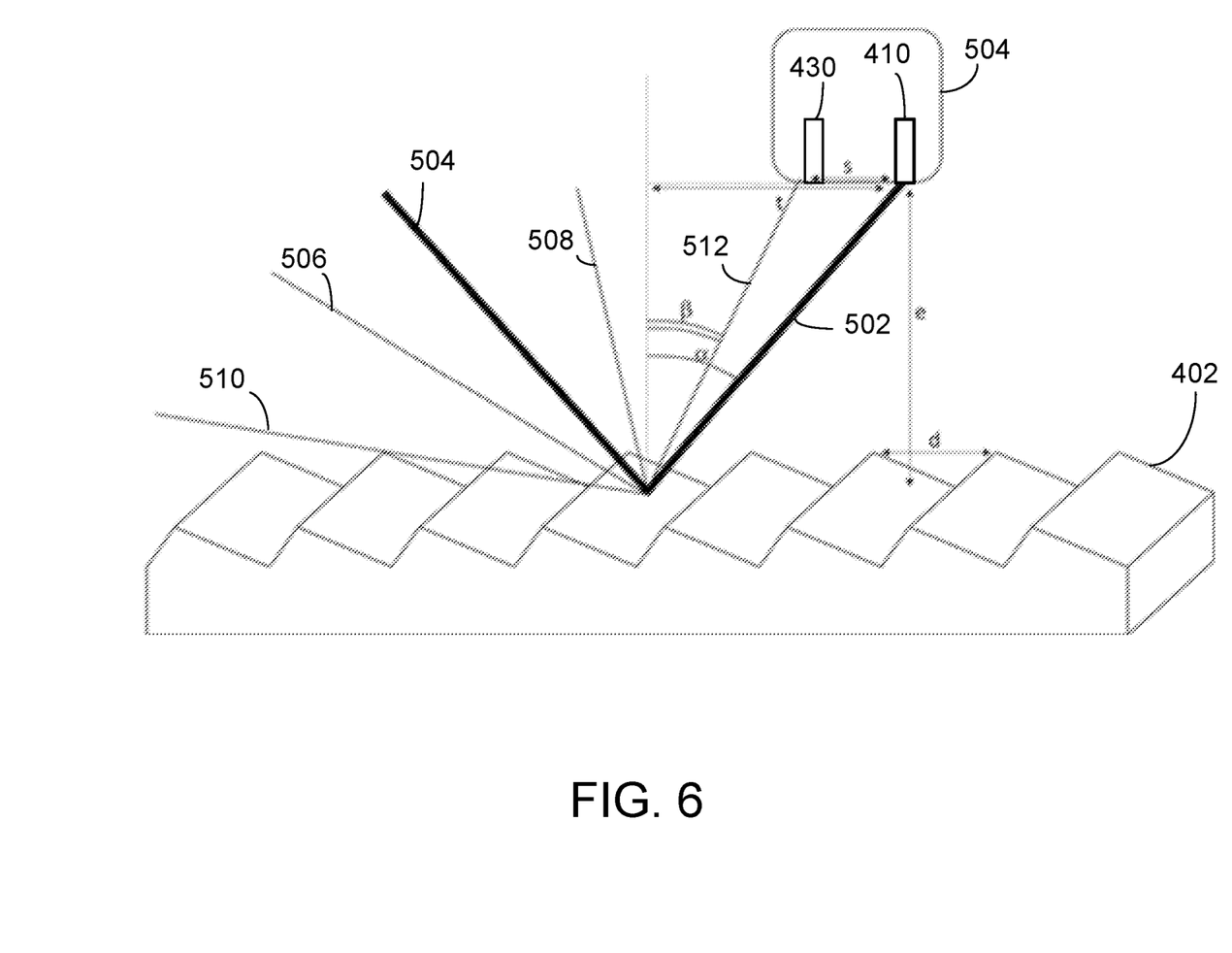
FIG. 6 is a perspective view illustrating the wavelength mode of inspection according to an embodiment of the present invention.

According to some embodiments of the present invention, the software modules 485 include sub-modules for operating the inspection apparatus and analyzing data in an angular mode 486, a wavelength mode 487, and a three-dimensional mode 488. FIG. 6 is a schematic perspective view illustrating the angular inspection mode. As shown FIG. 6, an embodiment of an inspection apparatus 400 begins an inspection as directed by the angular mode submodule 486 by first irradiating a section of the substrate 402 using radiation source 410, which is preferably a laser (monochromatic) source. Use of a monochromatic source allows the wavelength to be a fixed parameter in the analysis. In FIG. 6, radiation source 410 emits an activation beam 502 onto the photonic grating of structure 402. The incoming beam 502 is reflected via single beam 504, and is also diffracted by the grating along several beam paths, 506, 508, 510, 512 of different order. Beams 506 and 508 are of order 1 and −1, respectively, and beams 510 and 512 are of order 2 and −2. The relationship between the features of the grating and the parameters of the diffraction is given as:

$$d(\sin \alpha - \sin \beta) = n\lambda \quad (1)$$

where d is the distance between grooves in the grating, $\alpha$ is the incident angle of beam 502, $\beta$ is the diffraction angle of one beam 512, which is detected at sensor 430, n is the order of diffraction, and $\lambda$ is the wavelength of radiation. In this manner, given a constant wavelength ($\lambda$), order (n), and activation beam angle ($\alpha$), any change in grating spacing (d) will depend solely on the detected diffraction angle ($\beta$).

Beam 512, having order n=−2, is received by radiation sensor 430. Parameter $\alpha$ is the angle at which beam 502 is directed with respect to a vertical axis, and is therefore known from the configuration and position of the radiation source 410. Parameter $\beta$ can be calculated by considering the distance e between radiation source 410 and the radiation sensor 430, which is also known from the configuration of these components in apparatus 400, as well as the distance s between the apparatus 100 and the structure surface. In particular, the formula for $\beta$ is:

$$\beta = \arctan\left(\frac{e \tan \alpha - s}{e}\right) \quad (2)$$

Therefore, given the wavelength ($\lambda$) of the laser, the only unknown left in the grating equation (1) is the spacing (d) between the features. A quantification of this distance provides relative and absolute information about the deformation of the material. The distance is relative with respect to the value of the surrounding and also absolute because the value provided is a direct measurement of the status of the material in a specific spot and not a ratio.

As the spacing between the features changes, the value of s in equation (2) also changes in a corresponding manner. The recorded value of s depends on the type of radiation sensor employed. In some embodiments in which the radiation sensor is a single element such as an intensity meter, changes in s are captured as a decrease in signal intensity (where the sensor position is calibrated for maximum intensity for zero deformation). Single-element sensors do not indicate whether the change in displacement is a compression of extension. More preferably, the radiation sensor includes multiple sensitive elements such as a CCD array. By determining variation of intensity of a number of individual elements, multi-element sensors can indicate the direction of change (expansion or compression) as well as the magnitude of the deformation.

The sensitivity of the measurement is in general determined by the spacing between the features of the photonic material. Therefore, in order to detect a deformation on the order of nanometers, the order of magnitude of the spacing should also be in the nanometer range, and as a consequence also the wavelength of the radiation utilized for the inspection should also be in the nanometer range. For example considering in angular mode a grating with spacing of 800 nm, an inspection radiation with λ=500 nm, an incident angle α=45°; a deformation of 10 nm will change the angle of diffraction from 4.7° to 5.15°. Therefore, for this configuration a displacement 100 times smaller than the length of the material, determines a change in diffraction angle of slightly less than half a degree. This is easily measurable, as it results in a beam shift of almost 1 cm at a distance of 1 meter from the material. While the sensitivity of this technology has no theoretical limit, sensitivity for a displacement 1000 times smaller than the size of the object analyzed is easily achievable. Therefore, if an object like a storage tank has a diameter of 150 meters, the disclosed methods can easily detect an increase of 10 cm distributed along the entire diameter.

Apparatus 100 can also include a proximity sensor (not shown) to automatically determine the distance e between the radiation source and structure surface.

Figure 7:
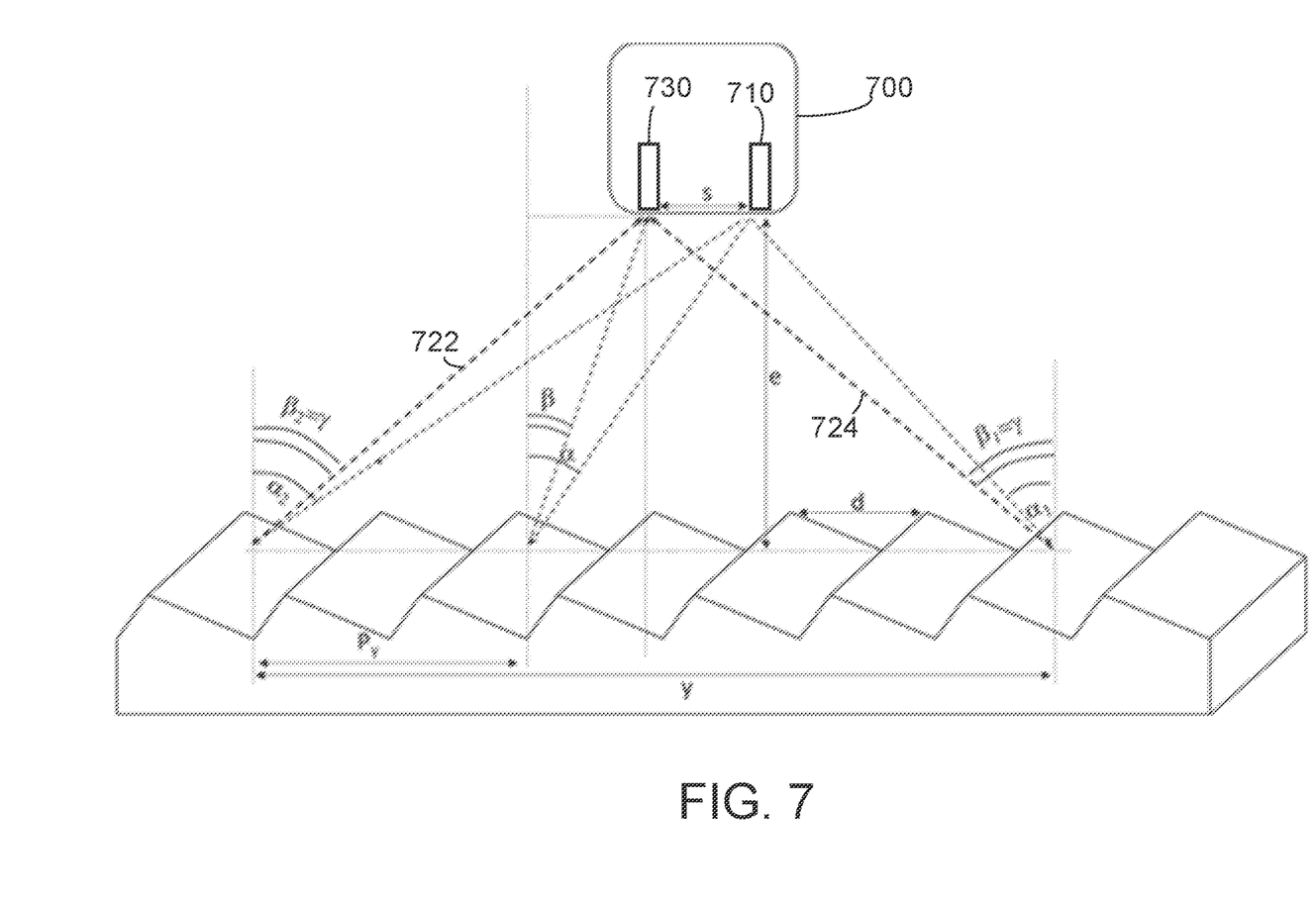
FIG. 7 is a flow chart of a method of inspecting a structure containing a photonic material according to an embodiment of the present invention.

As noted above, in addition to the angular mode, deformations in photonic materials can also be determined by operating the inspection apparatus in a wavelength mode. In the wavelength mode, the wavelength of diffracted light is the signal used to quantify the displacement. In this mode, light having multiple wavelengths (e.g., a multi-chromatic radiation source such as a white light) is directed on the sample and also diffracted according to the grating equation (1). FIG. 7 is a schematic perspective view illustrating the wavelength inspection mode. Another embodiment of an inspection apparatus 700 is shown in FIG. 7. The inspection apparatus includes a multi-chromatic light source 710 and a radiation sensor 730 capable of sensing different wavelengths in a relevant part of the spectrum such as a visible light or IR camera. The radiation sensor 730 can be an array of individual sensing elements capable of detecting multiple wavelengths simultaneously. As noted, multiple modes of operation can be combined in certain embodiments with the determination of deformation made as an average of the results returned from each approach, as a weighted average, or the multiple modes of operation can have results compared for validation of the results, or the results of a particular mode of operation can be selected based on prevailing conditions (e.g., humidity at the time of measurement).

Figure 8:
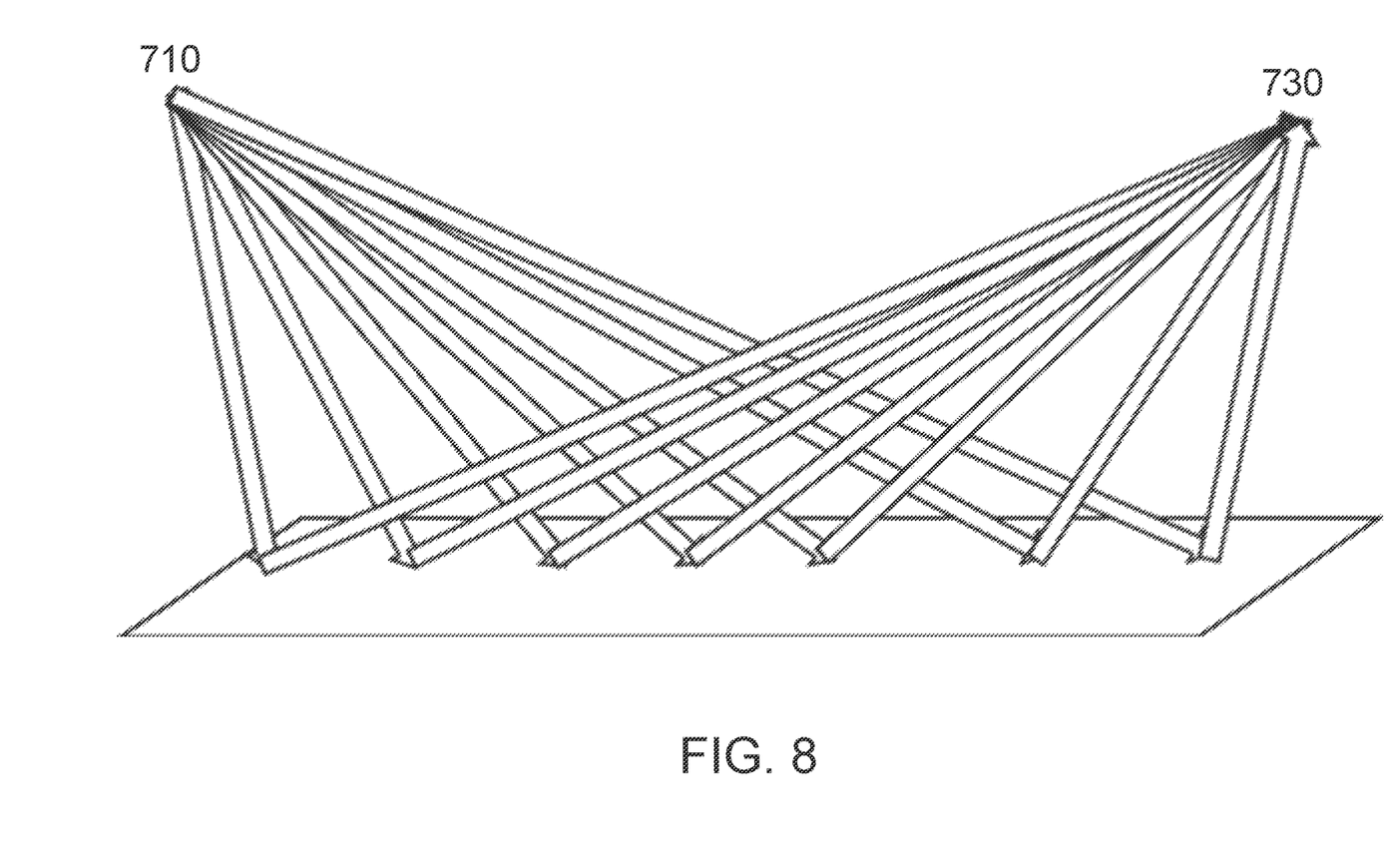
FIG. 8 is a schematic illustration of the wavelength mode of inspection according to an embodiment of the present invention.

FIG. 8 shows a general, schematic illustration of the wavelength mode. The multi-chromatic radiation source 710, or white light source, (in this figure shown on the left) illuminates a certain extended portion of the responsive strip. The diffracted radiation is scattered by the strip in all possible directions; however, the directions converge to a limited area where the radiation sensor 730 is placed. The radiation sensor 730 can be simply a camera sensor. From the point of view of the camera sensor 730, the diffractive strip appears as different colors in different positions, as each diffracting point on the strip responsible for sending radiation toward the sensor satisfies a different diffraction condition. By considering the geometry of measurement is possible to determine the level of stretching of the diffractive strip along the entire length of the strip. This arrangement can also reveal relative differences within the diffractive strip. For relative difference measurements it is not necessary to consider the exact geometry of the system, as it is possible to reveal irregular diffraction changes over a regular angular change in diffraction pattern.

An additional advantage of the arrangement schematically shown in FIG. 7 is the simplicity of the detection system, which can be extended from the source to the detection point, utilizing very simple elements, such as a source of continuous radiation, such as a white lamp, and a camera sensor. The size of the detection system is determined by the distance between these two aforementioned elements. This distance is not required to be necessarily comparable or larger than the size of the diffractive strip since a particular diffraction condition can be selected in which the incident radiation and diffracted radiation emerge at very close angles, and in certain cases the incident and diffracted radiation can even converge.

Returning to FIG. 7, the illuminated area of the structure surface is encompassed between angles $\alpha_1$ and $\alpha_2$. Each point on the surface that is illuminated diffracts the radiation in various directions, but only a limited range of radiation is collected by radiation sensor 730. The breadth of this range is determined by the size of the radiation sensor 730 and/or of an aperture in the apparatus 700 that leads to the sensor. In any case, due of the typical geometry of commonly fabricated gratings, the range is rather narrow. This narrowness is used to the advantage of detection, since a single wavelength can be associated with each pixel or point in the resultant image generated at the radiation sensor 730. An image collected by the sensor is delimited by the field of view of the sensor itself, which is shown as delimited by the dashed lines 722 and 724 in FIG. 7. This field of view is also delimited by the diffraction angles $\beta_1=\beta_2=\gamma$. As illustrated in FIG. 7, different wavelengths at different positions in the image can correspond to the same displacement d. More specifically, all the radiation collected by the sensor 430 is generated by the same displacement d, arrives from different angles, from $\alpha_1$, $\beta_1$ to $\alpha_2$, $\beta_2$, of differing wavelengths.

Accordingly, a photonic material with uniform spacing (i.e., without deformation due to tensile or compressive stresses) diffracts different wavelengths at different angles, and the angle of diffraction and detection position in the sensor image changes uniformly with the wavelength. A displacement will result in a local change of diffraction wavelength for a specific angle, or in a non-uniform change in wavelength over the illuminated area. In order to quantify this displacement is thus important to take several parameters into account: most importantly the relative position of the illuminated spot with respect to the inspection apparatus, and the color (wavelength) detected by radiation sensor 730.

The position of a pixel of a captured wavelength in the collected image can be used to accurately determine the position of the position of the illuminated spot with respect to the apparatus as a whole. For example, it is possible to express the angles α, β corresponding to the diffraction of a generic point as a function of the coordinate of the pixel corresponding to that specific point in the collected image. Angle α can be calculated from trigonometric considerations, by observing that:

$$tg\alpha = \frac{\frac{y}{2} - P_y + s}{e} \quad (3)$$

In equation (3), tgα is the tangent of α, y is the size of the image on the surface of the material, and $P_y$ is the position of the analyzed spot measured from the extremity of the image corresponding to pixel coordinate 0. $P_y$ can be calculated from the coordinate of the pixel $p_y$, the size of the image in pixels P, and the actual size of the image in length y, as:

$$P_y = \frac{p_y}{P} \cdot y \quad (4)$$

By substituting for $P_y$, equation (3) becomes:

$$tg\alpha = \frac{\frac{y}{2} - \frac{p_y}{P} \cdot y + s}{e} \quad (5)$$

Analogously, angle $\beta$ can be expressed as:

$$tg\beta = \frac{\frac{y}{2} - \frac{p_y}{P} \cdot y}{e} \quad (6)$$

Combining equations (5) and (6) into grating equation (1) yields a grating equation (7) for the wavelength mode:

$$d = \frac{n\lambda}{\sin\left(\arctan\left(\frac{\frac{y}{2} - \frac{p_y}{P} \cdot y + s}{e}\right)\right) - \sin\left(\arctan\left(\frac{\frac{y}{2} - \frac{p_y}{P} \cdot y}{e}\right)\right)} \quad (7)$$

Equation (7) is written in a convenient form because it is typically easy to measure the actual size of the image at a certain distance from the apparatus. Nevertheless, equation (7) can also be expressed by taking into account the angle of image collection ($\gamma$). First, the distance (y) can be expressed as:

$$y = 2e \cdot tg\gamma \quad (8)$$

Incorporating equation (8), equation (7) becomes:

$$d = \frac{n\lambda}{\sin\left(\arctan\left(tg\gamma\left(1 - \frac{2P_y}{P}\right) + \frac{s}{e}\right) - \sin\left(\arctan\left(tg\gamma\left(1 - \frac{2P_y}{P}\right)\right)\right)\right)} \quad (9)$$

Equations (7) and (9) provide the exact value of d, which is used to quantify any displacement in the material. As all parameters are known from the measurement setup and the architecture of the device, the only measured variable is $\lambda$.

The two modes described so far are adapted for the technology in the form of a grating or any other two dimensional structure with planar periodicity. However, the analysis can be extended also to three-dimensional periodic structures. For three-dimensional photonic materials, both angular and wavelength mode analyses are governed by different mechanisms. In a three-dimensional photonic crystal the periodic structure is associated with a periodic modulation of the dielectric constant. The photonic material has regions of allowed bands and forbidden stop bands for wavelengths in a similar way as a semiconductor spans an electronic band structure. An approximation of the wavelength of the stop band can be expressed as a combination of a modified version of Bragg's law of diffraction combined with Snell's law of refraction as:

$$\gamma = \frac{2Sa}{m\sqrt{h^2 + k^2 + l^2}}[\phi n_1 + (1 - \phi)n_2] \quad (10)$$

In equation (10), S is a shrinkage factor, taking into account the eventual shrinkage of the lattice structure during formation, is the parameter of the photonic crystal responsible for the specific stop band considered, m is the order of diffraction, h, k and l are the Miller indices, $\Phi$ is the volume fraction of one of the materials constituting the lattice, and $n_1$, $n_2$ are the refractive indices of the two materials. If there is a deformation of the photonic material, the parameter a will change. As a result, by monitoring the variation of the wavelength of the stop band, it is possible to monitor the distortion of the material. Typically, the change in the angle of observation in three-dimensional periodic structures does not affect the change in wavelength to the same extent as in two-dimensional photonic materials. Generally, there is a range of angles at which the wavelength of the stop band will be constant. However, once the angle changes by a certain magnitude, another lattice plane and lattice constant come into play, and change the stop band.

The measurement can be easily carried out with an apparatus as described above. The measurement can be performed in either reflection mode (i.e. by receiving a reflected beam from the photonic crystal) or alternatively in transmission mode. In reflection mode, the wavelength measured by the radiation sensor will correspond to the wavelength of the stop band. In transmission mode, the wavelength measured will be complementary to the stop band. The angle of incident radiation does not affect the measurements. One useful form of equation (10) for monitoring deformation of a three-dimensional photonic material is:

$$a = \frac{m\lambda\sqrt{h^2 + k^2 + l^2}}{2Sa[\phi n + (1 - \phi)n_2]} \quad (11)$$

In other embodiments, the stop band wavelength can be determined using the absorption spectrum of the structure. For absorption spectrum measurements, the measured value of the peak of the band will correspond to the wavelength of the stop band and not the complementary wavelength.

In some embodiments of methods of the present invention in which a camera is implemented as the radiation sensor, wavelength measurements can be determined using a camera hue scale. The hue (H) of a pixel of a camera can be used as an approximation of the wavelength. For example, in some cameras the hue can be modeled as traversing a 360 arc from red, through yellow, etc. and back to red. The hue increases as the wavelength in the visible range decreases. Therefore, by considering a limited range of hue to match the wavelength in the visible range from approximately 650 nm to 430 nm, it is possible to write an empirical correspondence as:

$$\lambda = 650 - 1.16H \quad (12)$$

The quantification of the wavelength through the hue (H) is not necessarily precise but there is a functional proportionality between the wavelength and hue. Therefore, equation (12) has a strong empirical character and can require calibration. This level of accuracy of the hue scale is sufficient for application in which local variation in deformation is more significant than absolute values.

Illustrative embodiments and arrangements of the present systems and methods provide a system and a computer implemented method, computer system, and computer program product for inspecting structures including device for enabling calibration according to the present invention. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A device for enabling calibration of a structure comprising:
    at least one elongate strap having a lower temperature expansion coefficient than the structure, and a length sufficient to encompass a circumference of an external surface of the structure; and
    at least one two-dimensional diffraction grating having periodic features aligned in perpendicular directions and a temperature expansion coefficient at least as high as the structure, wherein the diffraction grating is coupled to the strap and in direct contact with the external surface of the structure,
    wherein deformations in the external surface of the structure induce corresponding deformations in the diffraction grating.

2. The device of claim 1, wherein the at least one elongate strap includes a first strap positioned at a first height on the external surface of the structure and a second strap positioned at a second height on the external surface of the structure.

3. The device of claim 1, wherein one or more of the at least one elongate strap includes a plurality of segments, each of the plurality of segments including a diffraction grating.

4. The device of claim 1, wherein the at least one elongate strap is composed of a glass fiber material.

5. A system for enabling calibration of a structure comprising:
    an indicator device in contact with an external surface of the structure, the indicator device including:
        at least one elongate strap having a lower temperature expansion coefficient than the structure, and a length sufficient to encompass a circumference of an external surface of the structure;
        at least one two-dimensional diffraction grating having periodic features aligned in perpendicular directions and a temperature expansion coefficient at least as high as the structure, wherein the diffraction grating is coupled to the strap and in direct contact with the external surface of the structure, wherein deformations in the external surface of the structure induce corresponding deformations in the diffraction grating; and
    an inspection device for determining dimensional changes to the structure by interrogating the at least one diffraction grating of the indicator device.

6. The system of claim 5, wherein the inspection device includes:
    a radiation source for irradiating a section of the structure;
    a radiation sensor for receiving radiation diffracted from a photonic material in the section of the structure; and
    a processor coupled to the sensor configured to determine a deformation of the at least one diffraction gratin as a function of at least one of i) an intensity ii) a position and iii) a wavelength of the radiation received.

7. The system of claim 6, wherein the at least one elongate strap of the indicator device includes a first strap positioned at a first height on the external surface of the structure and a second strap positioned at a second height on the external surface of the structure.

8. The system of claim 7, wherein the radiation source emits monochromatic radiation and deformation of the at least one diffraction grating is determined as a function of an intensity of the radiation received at the radiation sensor.

9. The system of 7, wherein the radiation source emits polychromatic radiation and the deformation of the at least one diffraction grating is determined as a function of the wavelength of the radiation received.

10. The system of claim 9, wherein the polychromatic radiation is in the visible spectrum and the radiation sensor comprises a camera having a plurality of pixel elements having distinct positions.

11. The system of claim 6, wherein one or more of the at least one elongate strap of the indicator device includes a plurality of segments, each of the plurality of segments including a diffraction grating.

12. The system of claim 6, wherein the at least one elongate strap of the indicator device is composed of a glass fiber material.

13. The system of claim 6, wherein the radiation source emits monochromatic radiation and deformation of the at least one diffraction grating is determined as a function of an intensity of the radiation received at the radiation sensor.

14. The system of claim 6, wherein the radiation source emits polychromatic radiation and the deformation of the at least one diffraction grating is determined as a function of the wavelength of the radiation received.

15. The system of claim 5, wherein the multi-chromatic wavelength is in the visible spectrum and the radiation sensor comprises a camera having a plurality of pixel elements having distinct positions.

* * * * *